UNITED STATES PATENT OFFICE.

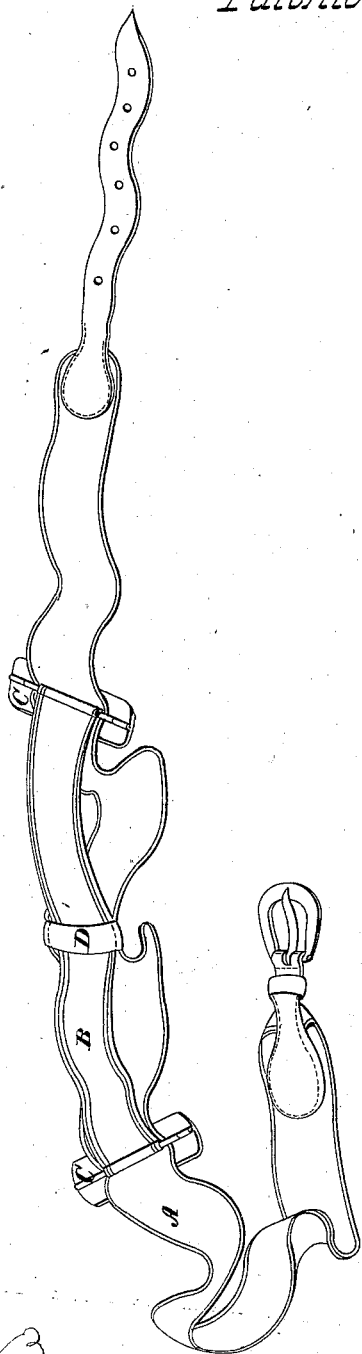

D. P. ROOD, OF WARSAW, NEW YORK.

IMPROVED SURCINGLE.

Specification forming part of Letters Patent No. 58,139, dated September 18, 1866.

*To all whom it may concern:*

Be it known that I, D. P. ROOD, of the town of Warsaw, county of Wyoming, and State of New York, have invented a new and useful Improvement in Surcingles; and I do hereby declare that the following is a full, clear, and exact description thereof, reference being had to the accompanying drawing and to the letters marked thereon.

The nature of my invention consists in combining, in any convenient and suitable manner, an elastic to the center, or nearly so, of the surcingle, which renders it easy and comfortable for the horse while being worn.

To enable others skilled in the art to make and use my invention, I will proceed to describe its construction and operation.

The figure represents a perspective view of my improved surcingle.

Letters of like name and kind represent like parts in the drawing.

A represents a surcingle, made of common webbing, in the ordinary manner, with buckle and strap at the ends, as shown in the drawing.

B is an elastic, made of rubber or any suitable material susceptible of elasticity, and secured by any proper means to the surcingle. In the drawing it is represented as secured by buckles C C, and at such points as to leave the surcingle loose over the elastic material, so that it may adjust itself to the size of the horse.

In order that the loose portion of the surcingle may not be cumbersome, I secure it by means of a strap, D.

Having thus described my invention, what I claim as new in my invention, and desire to secure by Letters Patent of the United States, is—

An elastic, B, made of rubber or other suitable material, in combination with the webbing A, so as to cause the surcingle to adjust itself to the varying size of the horse, for the purposes and substantially as herein described.

D. P. ROOD.

Witnesses:
B. N. PIERCE,
CHAS. W. BAILEY.